United States Patent
Hamauzu

(10) Patent No.: US 10,672,108 B2
(45) Date of Patent: Jun. 2, 2020

(54) IMAGE PROCESSING APPARATUS, IMAGE PROCESSING METHOD, AND IMAGE PROCESSING PROGRAM

(71) Applicant: FUJIFILM Corporation, Tokyo (JP)

(72) Inventor: Shin Hamauzu, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 179 days.

(21) Appl. No.: 15/883,099

(22) Filed: Jan. 30, 2018

(65) Prior Publication Data

US 2018/0232861 A1    Aug. 16, 2018

(30) Foreign Application Priority Data

Feb. 10, 2017    (JP) ................. 2017-022733

(51) Int. Cl.
| | | |
|---|---|---|
| *G06T 5/00* | (2006.01) | |
| *G06T 5/50* | (2006.01) | |
| *G06T 7/246* | (2017.01) | |
| *G06T 7/33* | (2017.01) | |

(52) U.S. Cl.
CPC ............... *G06T 5/002* (2013.01); *G06T 5/50* (2013.01); *G06T 7/246* (2017.01); *G06T 7/248* (2017.01); *G06T 7/33* (2017.01); *G06T 2207/10016* (2013.01); *G06T 2207/10116* (2013.01); *G06T 2207/20016* (2013.01);
(Continued)

(58) Field of Classification Search
None
See application file for complete search history.

(56) References Cited

U.S. PATENT DOCUMENTS

| | | | | | |
|---|---|---|---|---|---|
| 5,731,849 | A | * | 3/1998 | Kondo | H04N 5/23248 348/699 |
| 5,929,919 | A | * | 7/1999 | De Haan | H04N 7/0112 348/452 |

(Continued)

FOREIGN PATENT DOCUMENTS

| | | | | | |
|---|---|---|---|---|---|
| GB | 2327008 | A | * | 1/1999 | ............. H04N 5/145 |
| JP | 2007274067 | | | 10/2007 | |

(Continued)

OTHER PUBLICATIONS

English abstract of CN 104270561 A (Year: 2015).*

(Continued)

*Primary Examiner* — Michelle M Entezari Hausmann
(74) *Attorney, Agent, or Firm* — JCIPRNET

(57) ABSTRACT

A movement vector calculation unit calculates, from a processing target frame in a motion picture and an immediately previous frame, a movement vector between the processing target frame and the immediately previous frame. An index value calculation unit calculates an index value indicating a degree of reliability of a movement from the processing target frame and the immediately previous frame. A correction unit corrects the movement vector using the index value to calculate a corrected movement vector, and a registration unit registers the immediately previous frame to the processing target frame on the basis of the corrected movement vector. A synthesis unit synthesizes the processing target frame and the registered immediately previous frame to generate a synthetic frame.

19 Claims, 11 Drawing Sheets

(52) U.S. Cl.
CPC ........... *G06T 2207/20182* (2013.01); *G06T 2207/20221* (2013.01); *G06T 2207/20224* (2013.01)

(56) References Cited

U.S. PATENT DOCUMENTS

| | | | | |
|---|---|---|---|---|
| 8,134,603 | B2* | 3/2012 | Auberger | H04N 5/23248 348/208.3 |
| 8,218,083 | B2 | 7/2012 | Asamura et al. | |
| 10,142,545 | B2* | 11/2018 | Abe | G06T 7/215 |
| 10,376,236 | B2* | 8/2019 | Abe | A61B 8/0883 |
| 10,482,580 | B2* | 11/2019 | Kobayashi | G06T 5/002 |
| 2002/0057736 | A1* | 5/2002 | Fuji | H04N 19/63 375/240 |
| 2005/0286741 | A1* | 12/2005 | Watanabe | H04N 19/63 382/107 |
| 2006/0269155 | A1* | 11/2006 | Tener | G06T 3/4038 382/243 |
| 2009/0285301 | A1* | 11/2009 | Kurata | H04N 19/51 375/240.16 |
| 2010/0027661 | A1 | 2/2010 | Doida | |
| 2010/0033584 | A1* | 2/2010 | Watanabe | G06T 3/0062 348/208.13 |
| 2010/0309980 | A1* | 12/2010 | Suzuki | H04N 19/513 375/240.16 |
| 2011/0122265 | A1* | 5/2011 | Oryoji | H04N 5/23248 348/208.6 |
| 2012/0288187 | A1* | 11/2012 | Ichihashi | G06T 5/002 382/159 |
| 2014/0286593 | A1 | 9/2014 | Numata | |
| 2015/0172622 | A1* | 6/2015 | Yoon | G09G 3/3406 345/694 |
| 2015/0319452 | A1* | 11/2015 | Lewis | H04N 19/136 375/240.12 |
| 2016/0042500 | A1* | 2/2016 | Engberg | G06T 5/008 348/252 |
| 2016/0106329 | A1* | 4/2016 | Hoof | A61B 5/0261 600/479 |
| 2016/0127739 | A1* | 5/2016 | Terashima | H04N 19/63 375/240.16 |
| 2017/0049420 | A1* | 2/2017 | Shikama | A61B 8/5276 |
| 2017/0155824 | A1* | 6/2017 | Ikeda | H04N 5/23254 |
| 2018/0077354 | A1 | 3/2018 | Ikeda et al. | |
| 2018/0143321 | A1* | 5/2018 | Skowronek | G01S 17/66 |

FOREIGN PATENT DOCUMENTS

| | | | | |
|---|---|---|---|---|
| JP | 2010147774 | | 7/2010 | |
| JP | 2010288006 | A * | 12/2010 | ............ G09G 5/00 |
| JP | 2011182084 | | 9/2011 | |
| JP | 2011217311 | A * | 10/2011 | |
| JP | 2012090216 | | 5/2012 | |
| JP | 2012222510 | | 11/2012 | |
| JP | 2014187610 | | 10/2014 | |
| JP | 2015207809 | | 11/2015 | |
| JP | 2016218800 | | 12/2016 | |
| KR | 100197371 | B1 * | 6/1999 | |
| WO | 2007074605 | | 7/2007 | |

OTHER PUBLICATIONS

KR 10-0197371 B1 (Year: 1999).*
Machine translation of IDS JP2012090216A (Year: 2012).*
Machine Translation JP 2010-288006 A (Year: 2010).*
Machine Translation JP 2011-217311 A (Year: 2011).*
Takahiro Kimoto, "Activity on Scalable Video Coding in MPEG", IPSJ Technical Reports, vol. 2005 No. 23, Mar. 11, 2005,pp. 55-60.
"Office Action of Japan Counterpart Application," with English translation thereof, dated Dec. 3, 2019, p. 1-6.
"Office Action of Japan Counterpart Application", dated Mar. 3, 2020, with English translation thereof, pp. 1-7.

* cited by examiner

IMAGE PROCESSING APPARATUS, IMAGE PROCESSING METHOD, AND IMAGE PROCESSING PROGRAM

CROSS-REFERENCE TO RELATED APPLICATIONS

The present application claims priority under 35 U.S.C. § 119 to Japanese Patent Application No. 2017-022733, filed on Feb. 10, 2017. Each of the above application(s) is hereby expressly incorporated by reference, in its entirety, into the present application.

BACKGROUND OF THE INVENTION

1. Field of the Invention

The present invention relates to an image processing apparatus, an image processing method, and a non-transitory computer readable recording medium storing an image processing program for reducing noise of a motion picture.

2. Description of the Related Art

Various methods for reducing noise of a motion picture in which a plurality of static images, that is, frames are consecutive in a time axis direction have been proposed. For example, a recursive filter that smoothes frames in a time axis direction has been generally used. However, in a technique in which a recursive filter is used, in a case where there is a movement of a subject included in a motion picture, there is a problem in that a lag due to the movement occurs. For this reason, techniques for reducing noise while suppressing the occurrence of such a lag have been proposed.

For example, JP2015-207809A discloses a technique for adding a plurality of frames in a state where registration of a plurality of frames that are immediately adjacent to a processing target frame is performed. Further, JP2007-274067A discloses a technique for calculating a difference between frames in a motion picture to calculate a movement signal indicating a movement in the motion picture, extracting a noise component in the difference between the frames, subtracting the noise component from the movement signal to generate a signal indicating a movement degree, calculating a cyclic coefficient based on the signal indicating the movement degree, calculating the amount of noise circulation from the cyclic coefficient, and adding the amount of noise circulation to a current frame or subtracting the amount of noise circulation from the current frame to reduce noise.

On the other hand, in a medical field, in order to diagnose a movement of the digestive canal, the heart of a subject, a motion picture of X-rays is captured. In such an X-ray motion picture, similarly, it is desirable to reduce noise.

SUMMARY OF THE INVENTION

In capturing the above-described X-ray motion picture, in order to reduce an exposure dose to the subject, the intensity of X-rays is reduced. For this reason, in the X-ray motion picture, noise such as granulation extraordinarily becomes large. Further, even in a general motion picture, for example, if imaging is performed in a situation where the intensity of light is insufficient, noise extraordinarily increases. In this way, in such a motion picture having a large amount of noise, if registration between frames is performed using the technique disclosed in JP2015-207809A, it is not possible to detect a movement of an object with high accuracy due to the influence of the noise, consequently, and as a result, there is a concern that the registration fails. In this way, in a case where it is not possible to perform the registration with high accuracy, an artifact that an object included in a motion picture that does not originally move looks like it is moving occurs. Further, the technique disclosed in JP2007-274067A is a technique for reducing noise by subtracting the noise component from the movement signal, but is not a technique for detecting a movement of an object included in the motion picture with high accuracy.

In consideration of the above-mentioned problems, an object of the invention is to provide an image processing apparatus, an image processing method, and an image processing program capable of detecting a movement of an object included in a motion picture with high accuracy to reduce noise of the motion picture.

According to an aspect of the invention, there is provided an image processing apparatus comprising: a movement vector calculation unit that calculates, from a processing target frame and at least one previous frame that is acquired temporally prior to the processing target frame among a plurality of frames that form a motion picture, a movement vector between the processing target frame and the at least one previous frame; an index value calculation unit that calculates an index value indicating a degree of reliability of a movement between the processing target frame and the at least one previous frame, from the processing target frame and the at least one previous frame; a correction unit that corrects the movement vector between the processing target frame and the at least one previous frame using the index value to calculate a corrected movement vector; a registration unit that registers the at least one previous frame to the processing target frame on the basis of the corrected movement vector; and a synthesis unit that synthesizes the processing target frame and the at least one previous frame registered by the synthesis unit to generate a synthetic frame.

The motion picture is formed by consecutively capturing a static image at a rate of 30 sheets, 60 sheets or the like per second. In the invention, each of the static images that form the motion picture is defined as a "frame".

The "processing target frame" means a frame that is a processing target of the invention among a plurality of frames that form the motion picture.

The "index value indicating the degree of reliability of the movement" means a value indicating whether an object included in a processing target frame and at least one previous frame actually moves or not. For this reason, if the index value is large, the object actually moves, and if the index value is small, the object does not actually move even though a movement vector is large.

In the image processing apparatus according to this aspect of the invention, the previous frame may be a synthetic frame with respect to the previous frame.

The "synthetic frame with respect to the previous frames" means a synthetic frame generated using the previous frames as processing target frames.

Further, in the image processing apparatus according to this aspect of the invention, the index value calculation unit may calculate the index value having a larger value as the size of an object included in the motion picture becomes larger and a movement of the object becomes larger.

Further, in the image processing apparatus according to this aspect of the invention, the index value calculation means may calculate an absolute value of a difference value between corresponding pixels of the processing target frame and the at least one previous frame to generate at least one first difference image, extract a line structure from the first difference image, and calculate the index value on the basis of the size of the line structure and a movement thereof.

The "line structure" is a structure in which pixels are continuously present in a difference image. The line structure may be extracted by performing a filtering process using a differential filter, for example, with respect to a difference image.

Further, in the image processing apparatus according to this aspect of the invention, in a case where the previous frame is one immediately previous frame that is temporally adjacent to the processing target frame, the index value calculation unit may calculate an absolute value of a difference value between corresponding pixels of the processing target frame and the immediately previous frame to generate a first difference image, extract a line structure from the first difference image, calculate an absolute value of a difference value between corresponding pixels between previous frames that are temporally adjacent among a plurality of previous frames including the immediately previous frame to generate at least one second difference image, extract a line structure from the at least one second difference image, and calculate the index value on the basis of the size and a movement of the line structure extracted from the first difference image and the size and a movement of the line structure extracted from the at least one second difference image.

In this case, the index value calculation unit may set the number of the second difference images to become larger as a frame rate of the motion picture becomes larger.

The "immediately previous frame" means a frame that is temporally adjacent to a processing target frame, that is, a frame that is acquired immediately before the processing target frame.

Further, in the image processing apparatus according to this aspect of the invention, the index value calculation unit may spatially smooth the movement vector between the processing target frame and the at least one previous frame to calculate the index value.

In addition, the image processing apparatus according to this aspect of the invention may further include a storage unit that stores, in a case where the previous frame is one immediately previous frame that is temporally adjacent to the processing target frame, a movement vector with respect to the previous frame. Here, the index value calculation unit may smooth the movement vector between the processing target frame and the immediately previous frame and the movement vector with respect to the previous frame in a time axis direction to calculate the index value.

In the image processing apparatus according to this aspect of the invention, the index value calculation unit may calculate the index value that is normalized, and the correction unit may multiply the movement vector between the processing target frame and the at least one previous frame by the index value to calculate the corrected movement vector.

In the image processing apparatus according to this aspect of the invention, the synthesis unit may add and average the processing target frame and the at least one previous frame registered for every corresponding pixels to generate the synthetic frame.

In the image processing apparatus according to this aspect of the invention, the synthesis unit may calculate an absolute value of a difference value between corresponding pixels of the processing target frame and the at least one previous frame registered, set a weight of the processing target frame to become larger as the absolute value of the difference value becomes larger, and weight and add the processing target frame and the at least one previous frame registered to generate the synthetic frame.

Further, the image processing apparatus according to this aspect of the invention may further include a frequency band resolution unit that resolves the processing target frame and the at least one previous frame into each of a plurality of frequency bands. Here, the movement vector calculation unit may calculate each movement vector between the processing target frame and the at least one previous frame for each frequency band, the index value calculation unit may calculate the index value for each frequency band, the correction unit may calculate the corrected movement vector for each frequency band, the registration unit may register the at least one previous frame to the processing target frame for each frequency band, and the synthesis unit may synthesize the processing target frame and the at least one previous frame registered by the synthesis unit for each of frequency bands to generate each of band synthetic frames. The image processing apparatus may further include a frequency synthesis unit that synthesizes each of the band synthetic frames to generate the synthetic frame.

According to another aspect of the invention, there is provided an image processing method comprising: calculating, from a processing target frame and at least one previous frame that is acquired temporally prior to the processing target frame among a plurality of frames that form a motion picture, a movement vector between the processing target frame and the at least one previous frame; calculating an index value indicating a degree of reliability of a movement between the processing target frame and the at least one previous frame, from the processing target frame and the at least one previous frame; correcting the movement vector between the processing target frame and the at least one previous frame using the index value to calculate a corrected movement vector; registering the at least one previous frame to the processing target frame on the basis of the corrected movement vector; and synthesizing the processing target frame and the at least one previous frame registered to generate a synthetic frame.

According to still another aspect of the invention, there may be provided a non-transitory computer readable recording medium storing a program that causes a computer to execute the image processing method according to the above aspect of the invention.

According to the invention, a movement vector between a processing target frame and at least one previous frame is corrected using an index value indicating a degree of reliability of a movement between frames to calculate a corrected movement vector, and the at least one previous frame is registered to the processing target frame on the basis of the corrected movement vector. Here, in a case where an object included in a motion picture moves between frames, the size of the movement vector becomes large and the degree of reliability of the movement also becomes large. On the other hand, there is a case where noise included in the motion picture seems as if it is moving between frames, and in such a case, the movement vector becomes large, but the degree of reliability of the movement becomes small. For this reason, with respect to an actually moving object included in the motion picture, the size of the corrected movement vector becomes large, and with respect to noise or the like that does not move, the size of the corrected movement vector becomes small. Accordingly, in a case where at least one previous frame is registered to the processing target frame on the basis of the corrected movement vector, only the actually moving object in the motion picture is accurately registered. Accordingly, in a synthetic frame, an artifact indicating that the object that does not originally move, included in the motion picture, seems to be moving is reduced, and noise such as granulation included in a processing target frame is reduced. As a result, it is possible to generate a motion picture with a reduced artifact and reduced noise.

DESCRIPTION OF THE PREFERRED EMBODIMENTS

Figure 1:
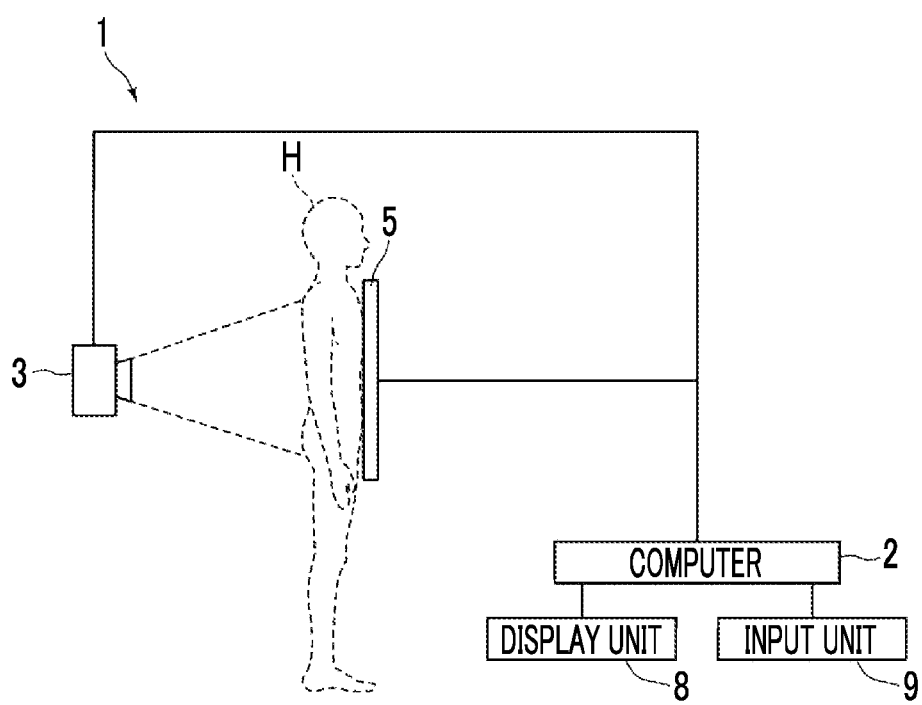
FIG. 1 is a schematic block diagram showing a configuration of a radiation image capturing system to which an image processing apparatus according to a first embodiment of the invention is applied.

Hereinafter, embodiments of the invention will be described with reference to the accompanying drawings. FIG. 1 is a schematic block diagram showing a configuration of a radiation image capturing system to which an image processing apparatus according to a first embodiment of the invention is applied. As shown in FIG. 1, the radiation image capturing system according to the first embodiment performs a process of imaging a motion picture based on X-rays and a process of reducing noise such as granulation included in the motion picture, and includes an imaging device 1, and a computer 2 that includes the image processing apparatus according to the first embodiment therein.

The imaging device 1 is an imaging device that irradiates a radiation detector 5 with X-rays that are emitted from an X-ray source 3 that is a radiation source and pass through a subject H to obtain a radiation image of the subject H.

The radiation detector 5 is capable of repeatedly performing recording and reading of a radiation image. The radiation detector 5 may employ a so-called direct-type radiation detector that generates electric charges by directly receiving irradiation of radiation, or may employ a so-called indirect-type radiation detector that once converts radiation into visible light and converts the visible light into an electric charge signal. Further, as a method for reading a radiation image signal, it is preferable to use a so-called thin film transistor (TFT) reading method for reading a radiation image signal by turning on or turning off a TFT switch or a so-called optical reading method for reading a radiation image signal by irradiation of reading light. However, the invention is not limited thereto, and other methods may be used.

Here, in capturing a motion picture, a signal is read from the radiation detector 5 at a predetermined frame rate while irradiating the subject H with a small dose of X-rays from the X-ray source 3 and irradiating the radiation detector 5 with the X-rays passed through the subject H. The read signal is input to the computer 2, and is displayed on a display unit 8 (which will be described later) as an X-ray motion picture of the subject H.

In capturing of only a static image, a radiation image of the static image is acquired by irradiating the subject H with a predetermined dose of X-rays from the X-ray source 3, irradiating the radiation detector 5 with the X-rays passed through the subject H, and reading a signal from the radiation detector 5.

The display unit 8 and an input unit 9 are connected to the computer 2. The display unit 8 includes a cathode ray tube (CRT), a liquid crystal display, or the like, and performs assistance of various inputs necessary for a radiation image acquired by imaging and processes performed in the computer 2. The input unit 9 includes a keyboard, a mouse, a touch panel, or the like.

An image processing program of the first embodiment is installed in the computer 2. In the first embodiment, the computer may be a workstation or a personal computer that is directly operated by a user, or a server computer connected to the workstation or the personal computer through a network. The image processing program may be recorded on a recording medium such as a digital versatile disc (DVD) or a compact disc read-only memory (CD-ROM) for distribution, and may be installed in the computer from the recording medium. Alternatively, the image processing program may be stored in a storage device of a server computer connected to a network or to a network storage in a state of being accessible from the outside, and may be downloaded to the computer as necessary, or may be installed thereinto.

Figure 2:
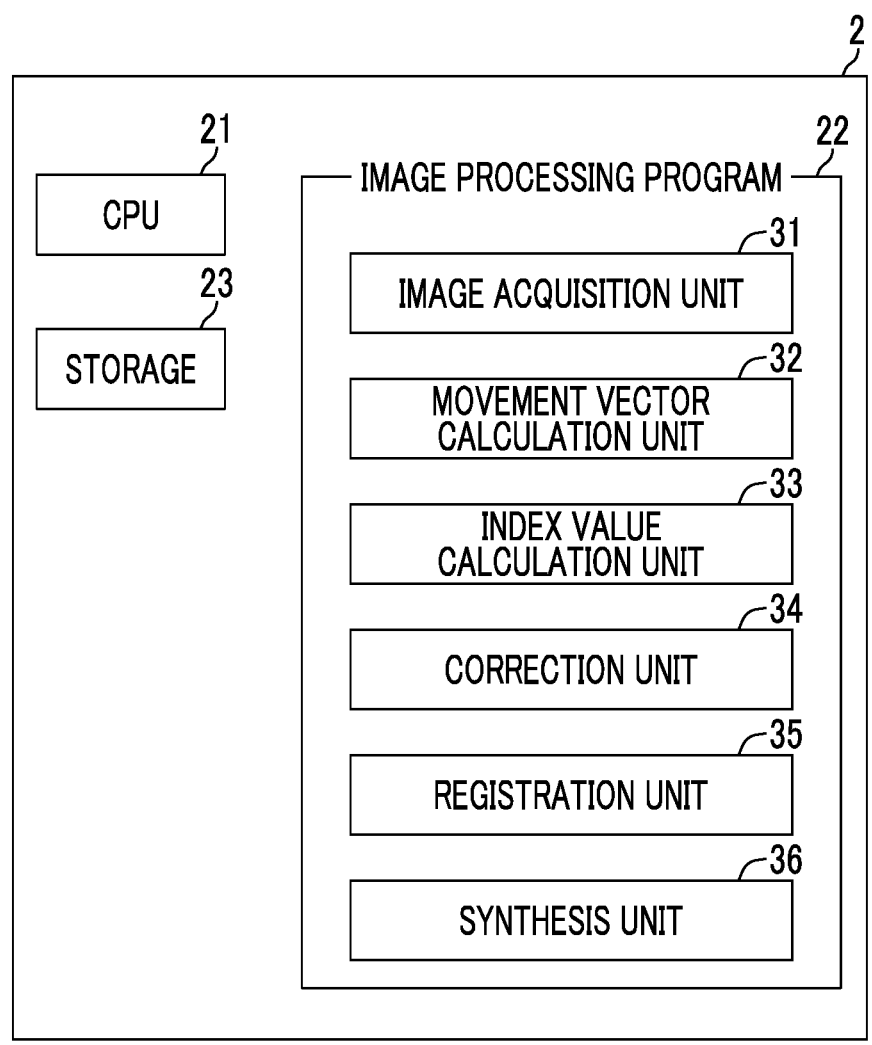
FIG. 2 is a diagram showing a schematic configuration of the image processing apparatus according to the first embodiment.

FIG. 2 is a diagram showing a schematic configuration of an image processing apparatus realized by installing an image processing program in the computer 2, in the first embodiment. As shown in FIG. 2, the image processing apparatus includes a central processing unit (CPU) 21, a memory 22, and a storage 23 as a configuration of a standard computer.

The storage 23 includes a storage device such as a hard disk or a solid-state drive (SSD), and stores a variety of information including a program for driving respective units of the imaging device 1 and an image processing program. Further, the storage 23 also stores a radiation image acquired through imaging.

The memory 22 temporarily stores a program or the like stored in the storage 23 in order to cause the CPU 21 to execute a variety of processes. The image processing program regulates an image acquisition process of causing the imaging device 1 to perform imaging to acquire a motion picture of X-rays, a movement vector calculation process of calculating, from a processing target frame and at least one previous frame that is acquired temporally prior to the processing target frame, a movement vector between the processing target frame and the at least one previous frame, an index value calculation process of calculating an index value indicating a degree of reliability of a movement between the processing target frame and the at least one previous frame from the processing target frame and the at least one previous frame, a correction process of correcting the movement vector between the processing target frame and the at least one previous frame using the index value to calculate a corrected movement vector, a registration process of registering the at least one previous frame with respect to the processing target frame on the basis of the corrected movement vector, and a synthesis process of synthesizing the processing target frame and the at least one previous frame registered to generate a synthetic frame, as the processes to be executed by the CPU 21.

Further, as the CPU 21 executes these processes according to the image processing program, the computer 2 functions as an image acquisition unit 31, a movement vector calculation unit 32, an index value calculation unit 33, a correction unit 34, a registration unit 35, and a synthesis unit 36. The computer 2 may include a processor or a processing circuit that performs the image acquisition process, the movement vector calculation process, the index value calculation process, the correction process, the registration process, and the synthesis process, respectively.

In this embodiment, in the movement vector calculation process, from a processing target frame and an immediately previous frame that is temporally adjacent to the processing target frame among a plurality of frames that forms a motion picture, a movement vector between the processing target frame and the immediately previous frame is calculated. In the index value calculation process, an index value indicating a degree of reliability of a movement between frames is calculated from the processing target frame and the immediately previous frame. In the registration process, the immediately previous frame is registered to the processing target frame on the basis of the corrected movement vector. In the synthesis process, the processing target frame and the registered immediately previous frame are synthesized to generate a synthetic frame.

The image acquisition unit 31 drives the X-ray source 3 to irradiate the subject H with X-rays, detects the X-rays passed through the subject H by the radiation detector 5, and reads a signal from the radiation detector 5 at a predetermined frame rate, to thereby acquire a motion picture M0 of X-rays that is formed by a plurality of frames. Accordingly, the acquisition of the motion picture M0 means sequential acquisition of frames that form the motion picture M0. The motion picture M0 may be acquired by a program other than the image processing program, and may be stored in the storage 23. In this case, the image acquisition unit 31 reads the motion picture M0 stored in the storage 23 from the storage 23 for image processing.

Figure 3:
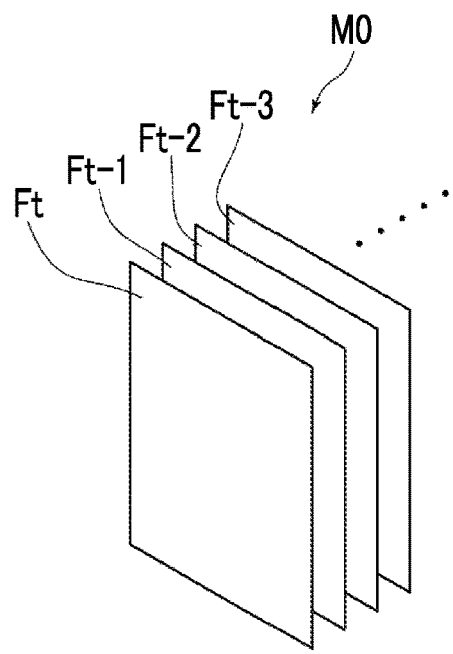
FIG. 3 is a diagram showing frames of a motion picture.

The movement vector calculation unit 32 calculates, from a processing target frame and an immediately previous frame that is temporally adjacent to the processing target frame, a movement vector between the processing target frame and the immediately previous frame. FIG. 3 is a diagram showing frames of the motion picture M0. As shown in FIG. 3, the motion picture M0 is formed of a plurality of frames. In the following description, it is assumed that the latest frame Ft is acquired at a current time point t and frames Ft-1, Ft-2, . . . are acquired at time points t-1, t-2, . . . before the current time point t. Further, in the following description, the latest frame Ft is referred to as a processing target frame, and the frame Ft-1 that is temporally adjacent to the latest frame Ft is referred to as an immediately previous frame. Further, the frames Ft-1, Ft-2, . . . are referred to as a plurality of previous frames including the immediately previous frame.

The movement vector calculation unit 32 calculates a movement vector between the processing target frame Ft and the immediately previous frame Ft-1 using a known method such as a template matching method, an optical flow estimation method, or the like. For example, in a case where the template matching method is used, a part of the processing target frame Ft is cut out as a template, at which position of the immediately previous frame Ft-1 the template is present is calculated, and its movement amount and movement direction are calculated as a movement vector.

Figure 4:
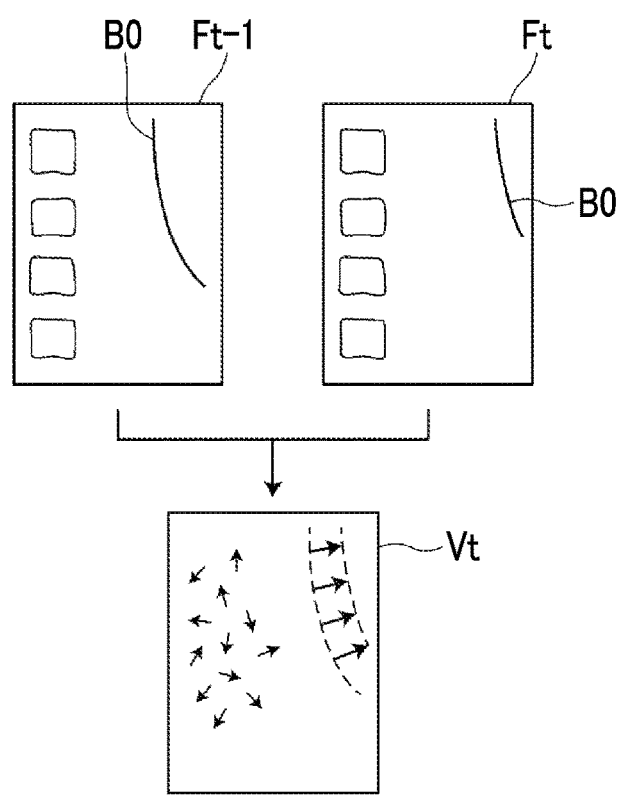
FIG. 4 is a diagram for illustrating calculation of a movement vector.

FIG. 4 is a diagram for illustrating calculation of a movement vector. In FIG. 4, arrows indicate movement vectors. As shown in FIG. 4, in a case where an object B0 included in the immediately previous frame Ft-1 moves in the processing target frame Ft, a movement vector Vt represents the direction of a movement of the object B0 and the size of the movement in a region where the object B0 is present. In a region other than the region where the object B0 is present, a movement vector Vt of a random size is present in a random direction under the influence of noise or the like. The movement vector Vt is calculated at each pixel position in the processing target frame Ft.

Figure 5:
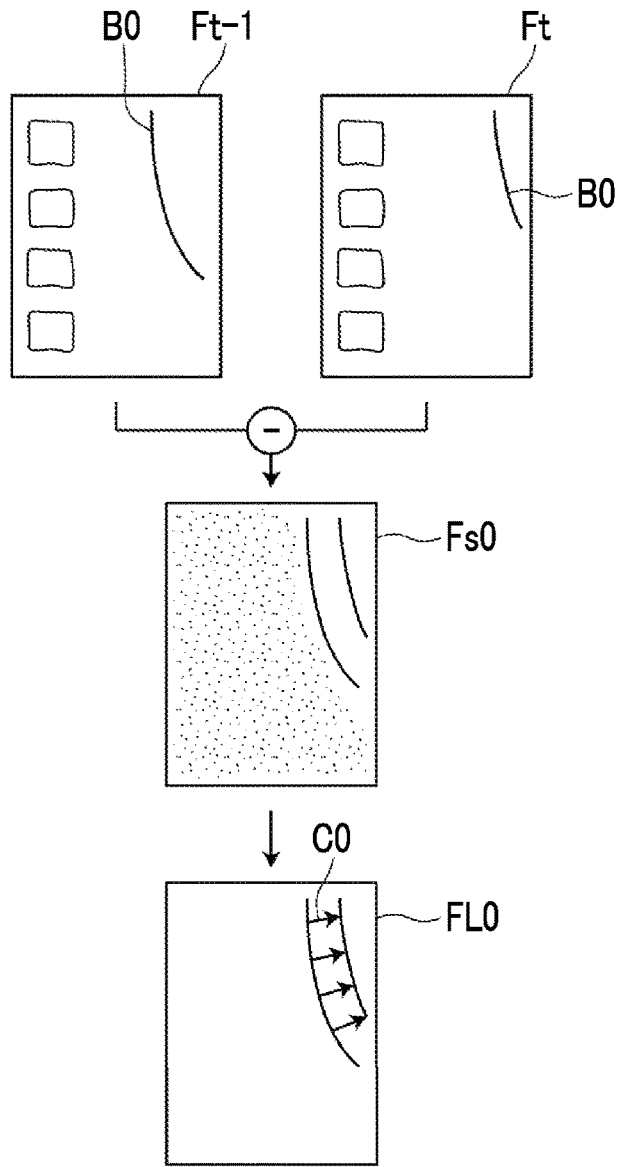
FIG. 5 is a diagram for illustrating calculation of an index value in the first embodiment.

The index value calculation unit 33 calculates an index value indicating a degree of reliability of a movement between frames from the processing target frame Ft and the immediately previous frame Ft-1. FIG. 5 is a diagram for illustrating calculation of an index value in the first embodiment. The index value calculation unit 33 calculates an absolute value of a difference value between corresponding pixels of the processing target frame Ft and the immediately previous frame Ft-1 to generate a difference image Fs0. The difference image Fs0 becomes a first difference image. As shown in FIG. 5, a structure of the object B0 and noise are included in the difference image Fs0. Further, the index value calculation unit 33 extracts a line structure in which pixels are continuously present from the difference image Fs0. The line structure may be extracted by performing a filtering process using a differential filter in up, down, left and right directions of the difference image Fs0, for example.

Here, in the noise included in the difference image Fs0, pixels are not continuously present, but in a moving object, pixels are continuously present. Thus, in a line structure image FL0 generated by extracting the line structure from the difference image Fs0, noise is removed from the difference image Fs0, and only the line structure of the moving object B0 is included. By extracting the line structure in this way, it is possible to separate a region of a moving object included in the motion picture M0 from a region of an object that does not move in the motion picture M0.

Further, the index value calculation unit 33 calculates a movement vector between line structures in the line structure image FL0, and calculates a maximum value of the size of the movement vector. In addition, the index value calculation unit 33 normalizes the calculated movement vector using the maximum value of the size of the movement vector to calculate an index value C0. Thus, the index value C0 has a value of 0 to 1. Specifically, as the degree of reliability of the movement becomes larger, the index value C0 becomes a value closer to 1. The index value C0 is also calculated at each pixel position in the processing target frame Ft in a similar way to the movement vector Vt. The index value C0 calculated in this way has a larger value as the size of an object included in the motion picture M0 becomes larger and a movement of the object becomes larger.

Here, the "object" is represented as a region surrounded by edges in the motion picture M, or a region where edges are continuous. The edges may be extracted by performing a filtering process using an edge detection filter, or the like. The edge detection filter may employ a Sobel filter, a Prewitt filter, and the like. The "size" of the object may be represented by the number of pixels in the region surrounded by the edges, or a maximum length when the region is cut with a straight line.

A threshold value may be set with respect to the index value C0, and in a case where the index value C0 is equal to or smaller than the threshold value, the value of the index value C0 may be set to 0. For example, in a case where the index value C0 is equal to or smaller than 0.3, the index value C0 may be set to 0. In a case where the index value C0 exceeds the threshold value, the value of the index value C0 may be set to 1.

Figure 6:
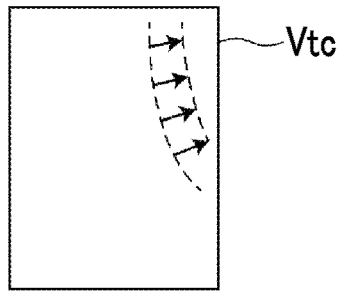
FIG. 6 is a diagram showing a corrected movement vector.

The correction unit 34 corrects the movement vector Vt using the index value C0 to calculate a corrected movement vector Vtc. Specifically, the correction unit 34 corrects the movement vector Vt at a pixel position where the index value C0 becomes 0 into 0 to calculate the corrected movement vector Vtc. The corrected movement vector Vtc at a pixel position where the index value C0 is not 0 uses the movement vector Vt as it is. FIG. 6 is a diagram showing the corrected movement vector Vtc.

The corrected movement vector Vtc may be calculated by multiplying the movement vector Vt at each pixel position by the index value C0. For example, in a case where the size of the movement vector Vt corresponds to 2 pixels in the processing target frame Ft and the index value C0 is 0.2, the size of the corrected movement vector Vtc becomes 2×0.2=0.4 pixels.

The registration unit 35 registers the immediately previous frame Ft-1 with respect to the processing target frame Ft on the basis of the corrected movement vector Vtc.

The synthesis unit 36 synthesizes the processing target frame Ft and the registered immediately previous frame Fct-1 to generate a synthetic frame Fg.

Figure 7:
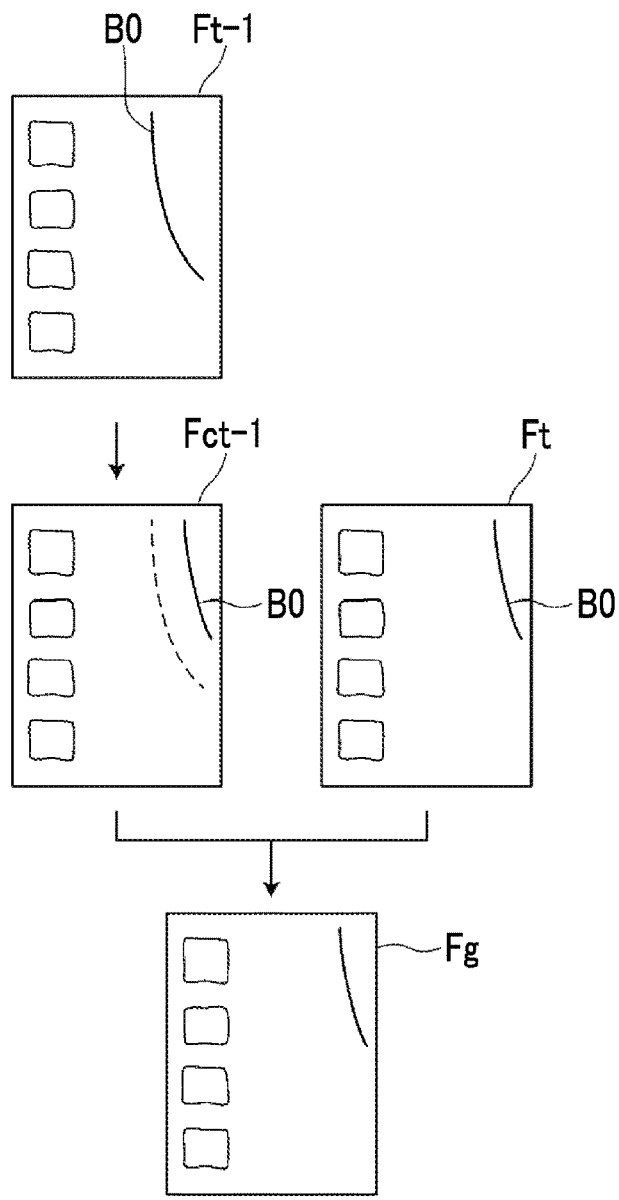
FIG. 7 is a diagram for illustrating registration and synthesis.

FIG. 7 is a diagram for illustrating registration and synthesis. As shown in FIG. 7, the registration unit 35 registers the immediately previous frame Ft-1 to the processing target frame Ft on the basis of the corrected movement vector Vtc. Specifically, the registration unit 35 deforms the immediately previous frame Ft-1 using the corrected movement vector Vtc to generate a registered immediately previous frame Fct-1. The deformation may be performed using a known method such as affine transformation. Thus, in the registered immediately previous frame Fct-1, the position of the moving object B0 matches the position of the object B0 in the processing target frame Ft. In FIG. 7, in the registered immediately previous frame Fct-1, the object B0 before deformation is indicated by a broken line.

The synthesis unit 36 adds and averages the processing target frame Ft and the registered immediately previous frame Fct-1 for every corresponding pixels to generate a synthetic frame Fg. In the synthesis unit 36, the processing target frame Ft and the registered immediately previous frame Fct-1 may be simply added and averaged, but the processing target frame Ft and the registered immediately previous frame Fct-1 may be weighted and added.

For example, an absolute value of a difference value at corresponding pixel positions of the processing target frame Ft and the registered immediately previous frame Fct-1 may be calculated, and as the absolute value of the difference value becomes larger, a weight of the processing target frame Ft is set to become larger. Then, the processing target frame Ft and the registered immediately previous frame Fct-1 may be weighted and added to generate the synthetic frame Fg.

Figure 8:
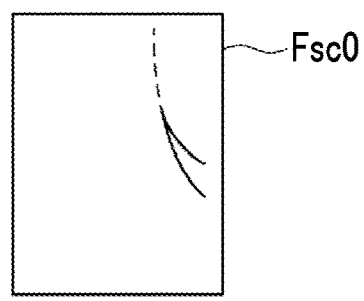
FIG. 8 is a diagram for illustrating weighting and addition of a processing target frame and an immediately previous frame that is registered.

FIG. 8 is a diagram for illustrating weighting and addition of the processing target frame Ft and the immediately previous frame Fct-1. In a case where the processing target frame Ft and the registered immediately previous frame Ft-1 are registered with high accuracy, the positions of the moving objects B0 included in the processing target frame Ft and the registered immediately previous frame Fct-1 match each other. However, in a case where the accuracy of registration of the processing target frame Ft and the immediately previous frame Ft-1 is poor, the positions of the moving objects B0 in the processing target frame Ft and the registered immediately previous frame Fct-1 do not match each other. Thus, in a case where an absolute value of a difference value at corresponding pixel positions of the processing target frame Ft and the registered immediately previous frame Fct-1 is calculated, as shown in FIG. 8, in a difference image Fsc0 indicating the absolute value of the difference value, the pixel value of the difference image becomes 0 as indicated by a broken line in a region where registration is performed with high accuracy, and becomes a value indicated by a solid line in a region where the accuracy of registration is poor.

In such a case, if the processing target frame Ft and the registered immediately previous frame Fct-1 are simply added and averaged, an artifact is generated due to the fact that the registration of the processing target frame Ft and the immediately previous frame Ft-1 is not performed with high accuracy. For this reason, in a region where the absolute value of the difference value at the corresponding pixel positions of the processing target frame Ft and the registered immediately previous frame Fct-1 becomes larger, it is preferable to set the weight of the processing target frame Ft to become larger to perform the weighting and addition of the processing target frame Ft and the registered immediately previous frame Fct-1. Thus, in the synthetic frame Fg, it is possible to prevent the occurrence of the artifact due to the fact that the registration of the processing target frame Ft and the immediately previous frame Ft-1 is not performed with high accuracy.

Figure 9:
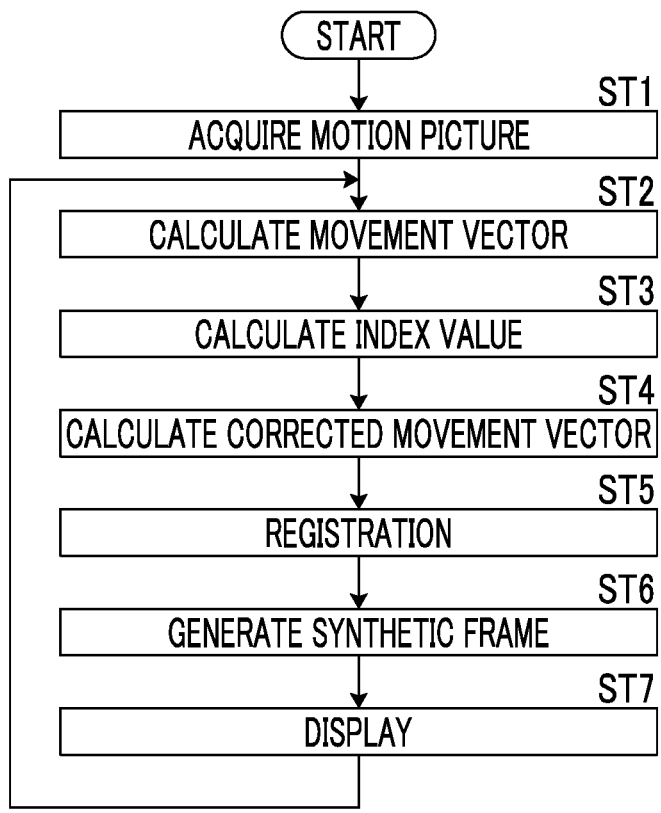
FIG. 9 is a flowchart showing processes performed in the first embodiment.

Next, processes performed in the first embodiment will be described. FIG. 9 is a flowchart showing processes in the first embodiment. First, the image acquisition unit 31 acquires an X-ray motion picture M0 from the radiation detector 5 (step ST1). Then, the movement vector calculation unit 32 calculates, from a processing target frame Ft and an immediately previous frame Ft-1 among a plurality of frames that form the motion picture M0, a movement vector Vt between the processing target frame Ft and the immediately previous frame Ft-1 (step ST2). Further, the index value calculation unit 33 calculates an index value C0 indicating a degree of reliability of a movement between frames from the processing target frame Ft and the immediately previous frame Ft-1 (step ST3).

The correction unit 34 corrects the movement vector Vt using the index value C0 to calculate a corrected movement vector Vtc (step ST4), the registration unit 35 registers the immediately previous frame Ft-1 to the processing target frame Ft on the basis of the corrected movement vector Vtc (step ST5), and the synthesis unit 36 synthesizes the processing target frame Ft and the registered immediately previous frame Fct-1 to generate a synthetic frame Fg (step ST6). The generated synthetic frame Fg is displayed as one frame of the motion picture M0 on the display unit 8 (step ST7), and then, the procedure returns to step ST2. Thus, whenever the frame of the motion picture M0 is acquired, the processes of steps ST2 to ST6 are performed, so that the synthetic frame Fg is generated and the motion picture M0 that includes the synthetic frame Fg is displayed on the display unit 8.

In this way, in this embodiment, the movement vector Vt between the processing target frame Ft and the immediately previous frame Ft-1 is corrected using the index value C0 indicating the degree of reliability of the movement between the frames to calculate the corrected movement vector Vtc, and the immediately previous frame Ft-1 is registered to the processing target frame Ft on the basis of the corrected movement vector Vtc. Here, in a case where an object B0 included in the motion picture M0 moves between frames, the size of the movement vector Vt becomes large, and the degree of reliability of the movement also becomes large. On the other hand, there is a case where noise included in the motion picture M0 seems as if it is moving between frames, and in such a case, the movement vector Vtc becomes large, but the degree of reliability of the movement becomes small. For this reason, with respect to an actually moving object included in the motion picture M0, the corrected movement vector Vtc becomes large, and with respect to noise or the like that does not move, the corrected movement vector Vtc becomes small. Accordingly, in a case where the immediately previous frame Ft-1 is registered to the processing target frame Ft on the basis of the corrected movement vector, only the actually moving object in the motion picture M0 is accurately registered. Accordingly, in the synthetic frame Fg, an artifact indicating that the object B0 that does not originally move, included in the motion picture M0, seems to be moving is reduced, and noise included in the processing target frame Ft is reduced. As a result, it is possible to generate the motion picture M0 with a reduced artifact and reduced noise.

Next, a second embodiment of the invention will be described. Since a configuration of an image processing apparatus according to the second embodiment is the same as the configuration of the image processing apparatus according to the first embodiment and only processes to be performed are different therefrom, detailed description of the configuration will not be repeated. In the first embodiment, the index value C0 is calculated using the processing target frame Ft and the immediately previous frame Ft-1, but in the second embodiment, the index value C0 is calculated using a plurality of previous frames including the processing target frame Ft and the immediately previous frame Ft-1.

Figure 10:
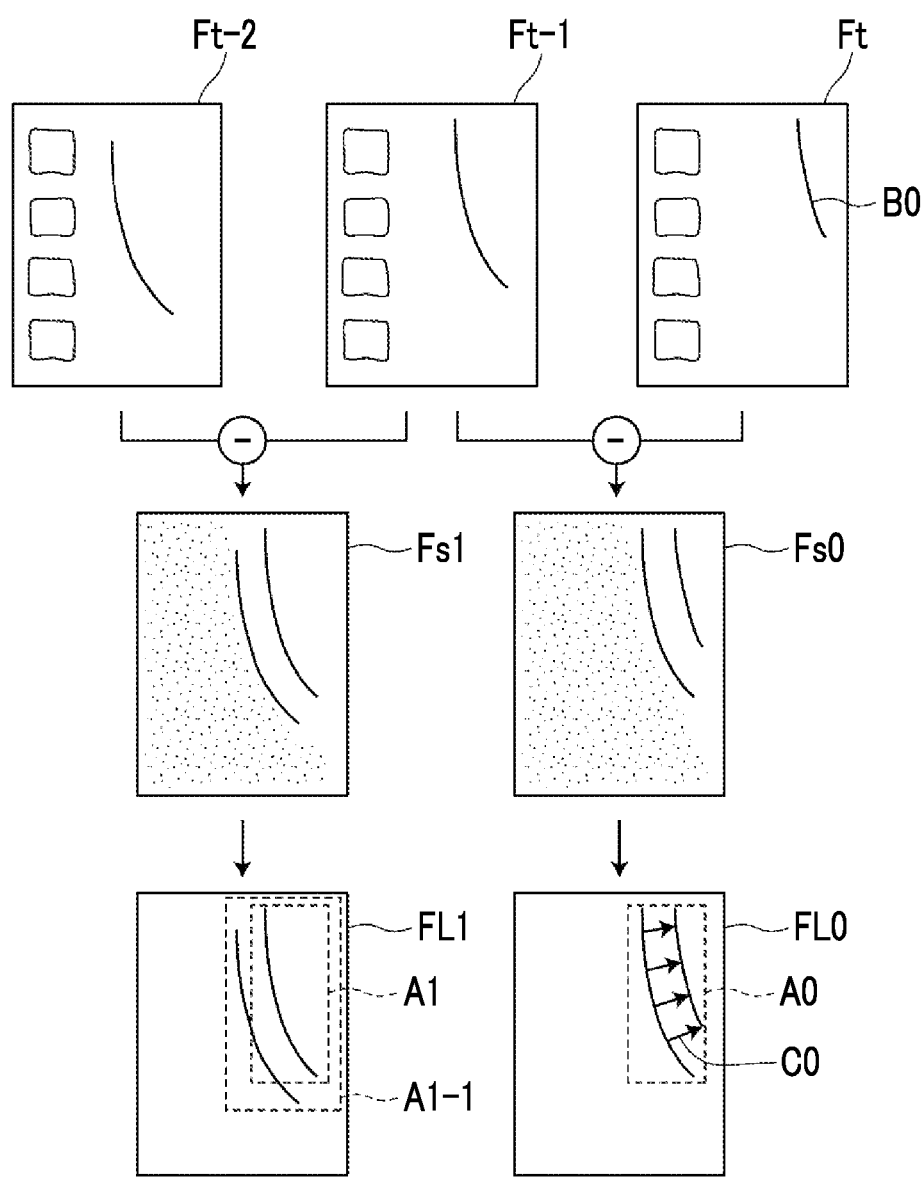
FIG. 10 is a diagram for illustrating calculation of an index value in a second embodiment.

FIG. 10 is a diagram for illustrating calculation of an index value in the second embodiment. In the first embodiment, the absolute value of the difference value between corresponding pixels of the processing target frame Ft and the immediately previous frame Ft-1 is calculated to generate the difference image Fs0. In the second embodiment, an absolute value of a difference value between corresponding pixels of the immediately previous frame Ft-1 and a previous frame Ft-2 that is temporally adjacent thereto is calculated to generate a difference image Fs1. The difference image Fs1 becomes a second difference image. As shown in FIG. 10, a structure of an object B0 and noise are also included in the difference image Fs1. In the second embodiment, the index value calculation unit 33 extracts a line structure from the difference images Fs0 and Fs1. In line structure images FL0 and FL1 generated in this way, noise is removed from the difference images Fs0 and Fs1, and only the line structure of the moving object B0 is included.

In the second embodiment, the index value calculation unit 33 compares the line structure image FL0 with the line structure image FL1, specifies a region A0 where the line structure is present in the line structure image FL0, and specifies a region A1 corresponding to the region A0 in the line structure image FL1. Further, the index value calculation unit 33 determines whether a line structure is present in the vicinity of the specified region A1. Specifically, the index value calculation unit 33 sets a region A1-1 obtained by enlarging the region A1 in the line structure image FL1 at a predetermined magnification in the line structure image FL1, and determines whether a line structure is included in the region A1-1. Further, in a case where the line structure is included in the region A1-1, the index value calculation unit 33 determines that the line structure is present in the vicinity of the specified region A1. Then, the index value calculation unit 33 calculates a movement vector of the line structure calculated in the line structure image FL0, and normalizes the size of the calculated movement vector in a similar way to the first embodiment to calculate the index value C0. In a case where the determination is negative, the index value calculation unit 33 sets the movement vector of the line structure calculated in the line structure image FL0 to 0. Thus, the index value C0 becomes 0.

By calculating the index value C0 in this way, it is possible to calculate the index value C0 having a larger value as the size of the object B0 included in the motion picture M0 becomes larger and a movement of the object B0 becomes larger, and thus, it is possible to further reduce an artifact of the synthetic frame Fg.

In the second embodiment, as the frame rate becomes larger, the number of second difference images may be set to become larger. For example, in a case where the frame rate is 30 fps, as described above, only the difference image Fs1 between the immediately previous frame Ft-1 and the previous frame Ft-2 that is temporally adjacent thereto is calculated to calculate the index value C0, but in a case where the frame rate is 60 fps, since a movement of the object B0 between frames becomes small compared with a case where the frame rate is 30 fps, a difference image Fs2 between the previous frame Ft-2 and a previous frame Ft-3 that is temporally adjacent thereto may be calculated to calculate the index value C0.

In this case, first, in a similar way to the above description, the line structure image FL0 generated from the difference image Fs0 is compared with the line structure image FL1 generated from the difference image Fs1, the region A1 corresponding to the region A0 where the line structure is present in the line structure image FL0 is specified in the line structure image FL1, and it is determined whether a line structure is present in the vicinity of the specified region A1, similar to the above description. In a case where the line structure is present in the vicinity of the specified region A1, the line structure image FL1 generated from the difference image Fs1 is further compared with the line structure image FL2 generated from the difference image Fs2, a region corresponding to a region where the line structure is present in the line structure image FL1 is specified in the line structure image FL2, and it is determined whether a line structure is present in the vicinity of the specified region. Furthermore, in a case where the line structure is present in the vicinity of the specified region, a movement vector of the line structure calculated in the line structure image FL0 is calculated, and the size of the calculated movement vector is normalized in a similar way to the first embodiment to calculate the index value C0. In a case where the determination is negative, the movement vector of the line structure calculated in the line structure image FL0 is set to 0, and the index value C0 is set to 0.

In this way, by setting the number of second difference images to become larger as the frame rate of the motion picture M0 becomes larger, it is possible to reliably calculate the index value C0 having a larger value as the size of the object B0 included in the motion picture M0 becomes larger and its movement amount becomes larger. Accordingly, it is possible to further reduce an artifact of the synthetic frame Fg.

In a case where the frame rate of the motion picture M0 is small, the index value C0 may be calculated according to the first embodiment, and in a case where the frame rate is large, the index value C0 may be calculated according to the second embodiment. For example, in a case where the frame rate is 30 fps, the index value C0 may be calculated according to the first embodiment, and in a case where the frame rate is 60 fps, the index value C0 may be calculated according to the second embodiment.

Next, a third embodiment of the invention will be described. Since a configuration of an image processing apparatus according to a third embodiment is the same as the configuration of the image processing apparatus according to the first embodiment and only processes to be performed are different therefrom, detailed description of the configuration will not be repeated. The third embodiment is different from the first embodiment in that the movement vector between the processing target frame Ft and the immediately previous frame Ft-1 is spatially smoothed to calculate the index value C0.

In the third embodiment, the index value calculation unit 33 spatially smoothes the movement vector Vt shown in FIG. 4 to calculate the index value C0. For example, the index value calculation unit 33 performs a filtering process with respect to the movement vector Vt using a low pass filter of a predetermined size (for example, 5×5), to thereby spatially smoothen the movement vector Vt to calculate the index value C0. In a similar way to the first embodiment, it is preferable to calculate the index value C0 by normalizing a movement vector smoothened by a maximum value of the size of the smoothened movement vector Vt. Further, the correction unit 34 corrects the movement vector Vt using the index value C0 to calculate a corrected movement vector Vtc.

Here, in a case where the object B0 included in the motion picture M0 moves, the movement vectors Vt between the processing target frame Ft and the immediately previous frame Ft-1, corresponding to the object B0, are relatively large and are directed in the same direction. On the other hand, the movement vectors Vt between the processing target frame Ft and the immediately previous frame Ft-1, corresponding to noise included in the motion picture M0, are directed in random directions regardless of their sizes. For this reason, by spatially smoothing the movement vector Vt between the processing target frame Ft and the immediately previous frame Ft-1 to calculate the index value C0, similarly, it is possible to calculate the index value C0 having a large value with respect to the moving object B0 included in the motion picture M0 and having a small value with respect to noise. Accordingly, by using the index value C0 calculated in this way, it is possible to further reduce an artifact of the synthetic frame Fg.

Next, a fourth embodiment of the invention will be described. Since a configuration of an image processing apparatus according to the fourth embodiment is the same as the configuration of the image processing apparatus according to the first embodiment and only processes to be performed are different therefrom, detailed description of the configuration will not be repeated. The fourth embodiment is different from the first embodiment in that the movement vector between the processing target frame Ft and the immediately previous frame Ft-1 and a movement vector with respect to a previous frame are smoothened in a time axis direction to calculate the index value C0.

Here, in the fourth embodiment, the synthetic frame Fg is generated with respect to frames included in the motion picture M0, and for this reason, a movement vector is generated for each frame. In the fourth embodiment, it is assumed that a movement vector generated with respect to each frame is stored in the storage 23.

Figure 11:
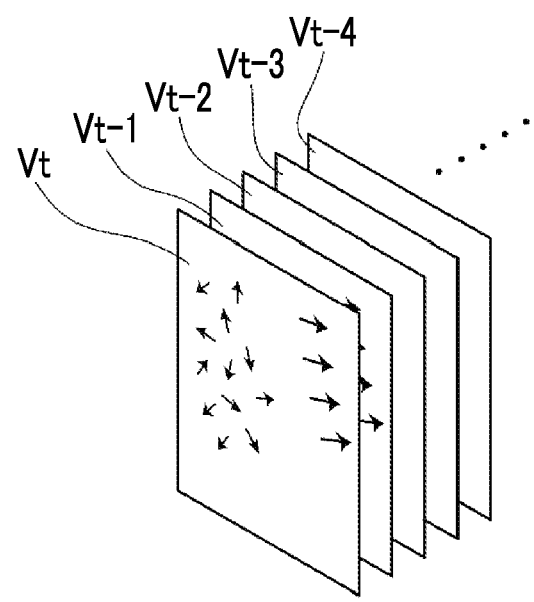
FIG. 11 is a diagram showing a schematic configuration of an image processing apparatus in a fourth embodiment.

FIG. 11 is a diagram for illustrating calculation of an index value in the fourth embodiment. As shown in FIG. 11, a movement vector Vt is calculated with respect to the processing target frame Ft. Further, with respect to a plurality of previous frames Ft-1, Ft-2, . . . , movement vectors Vt-1, Vt-2, . . . calculated when the synthetic frame Fg is generated are stored in the storage 23. In the fourth embodiment, the index value calculation unit 33 smoothes the movement vector Vt with respect to the processing target frame Ft and the movement vectors Vt-1, Vt-2, . . . with respect to the previous frames in a time axis direction. Specifically, the index value calculation unit 33 adds movement vectors at corresponding pixel positions in the processing target frame Ft and the previous frames, and divides the result by the number of the added movement vectors, to thereby smoothen the movement vectors to calculate the index value C0. Similar to the first embodiment, it is preferable to normalize a movement vector smoothened by a maximum value of the size of the smoothened movement vector Vt to calculate the index value C0. Further, the correction unit 34 corrects the movement vector Vt using the index value C0 to calculate a corrected movement vector Vtc.

Here, in a case where the object B0 included in the motion picture M0 moves, the movement vectors Vt between the processing target frame Ft and the immediately previous frame Ft-1, and the movement vectors Vt-1, Vt-2, . . . with respect to the previous frames, corresponding to the object B0, are relatively large and are directed in the same direction. On the other hand, the movement vectors Vt between the processing target frame Ft and the immediately previous frame Ft-1, and the movement vectors Vt-1, Vt-2, . . . with respect to the previous frames, corresponding to noise included in the motion picture M0, are directed in random directions regardless of their sizes. For this reason, by smoothing the movement vector Vt between the processing target frame Ft and the immediately previous frame Ft-1 in a time axis direction, and the movement vectors Vt-1, Vt-2, . . . with respect to the previous frames to calculate the index value C0, similarly, it is possible to calculate the index value C0 having a large value with respect to the moving object B0 included in the motion picture M0. Accordingly, by using the index value C0 calculated in this way, it is possible to further reduce an artifact of the synthetic frame Fg.

Figure 12:
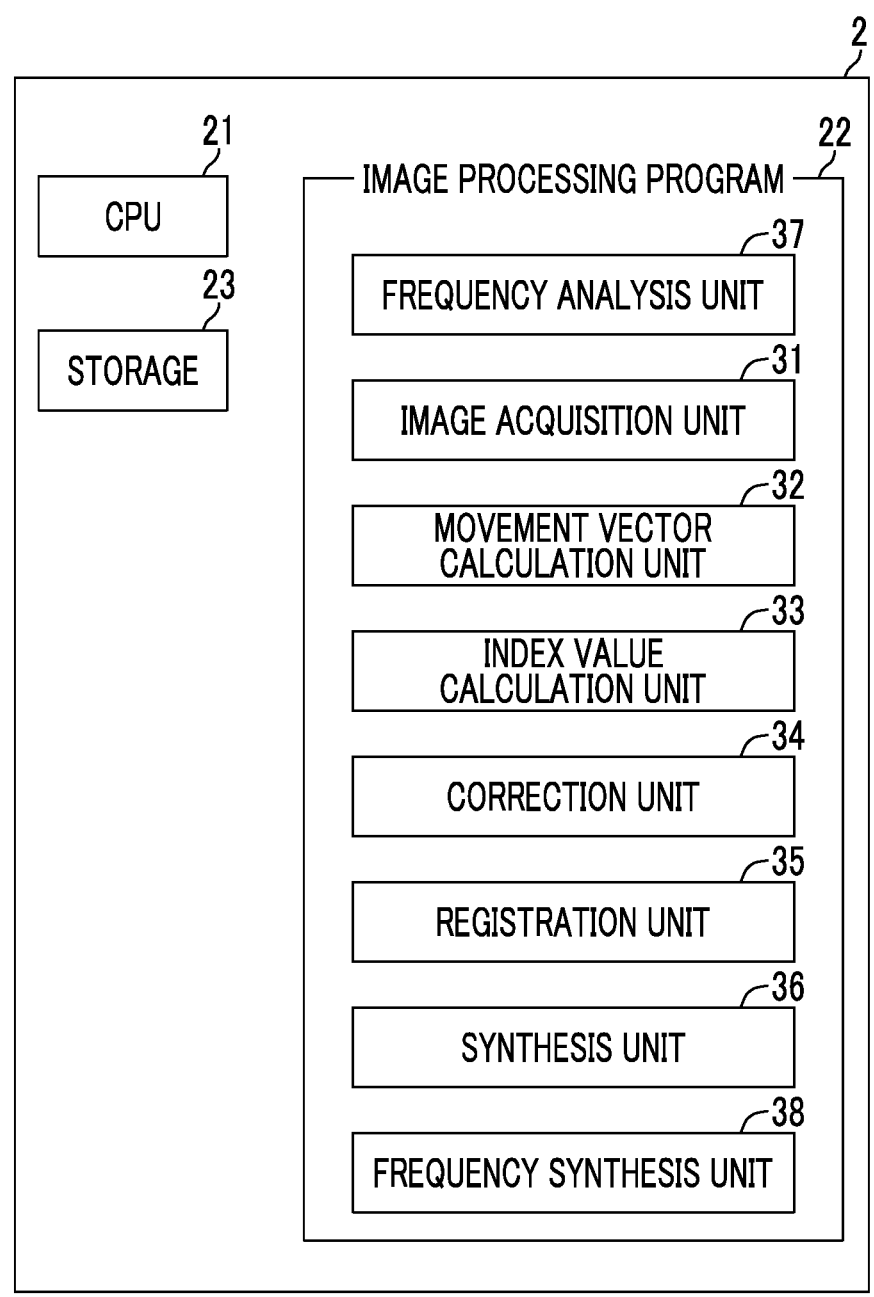
FIG. 12 is a diagram for illustrating calculation of an index value in a fifth embodiment.

Next, a fifth embodiment of the invention will be described. FIG. 12 is a diagram showing a schematic configuration of an image processing apparatus realized by installing an image processing program in the computer 2 in the fifth embodiment. The same reference numerals in FIG. 12 are given to the same configurations as in FIG. 2, and detailed description thereof will not be repeated. The image processing apparatus according to the fifth embodiment is different from the first embodiment in that a frequency resolution unit 37 that resolves the processing target frame Ft and the immediately previous frame Ft-1 into each of a plurality of frequency bands and a frequency synthesis unit 38 that synthesizes each of band synthetic frames generated for each of frequency bands as described later to generate a synthetic frame are further provided.

Figure 13:
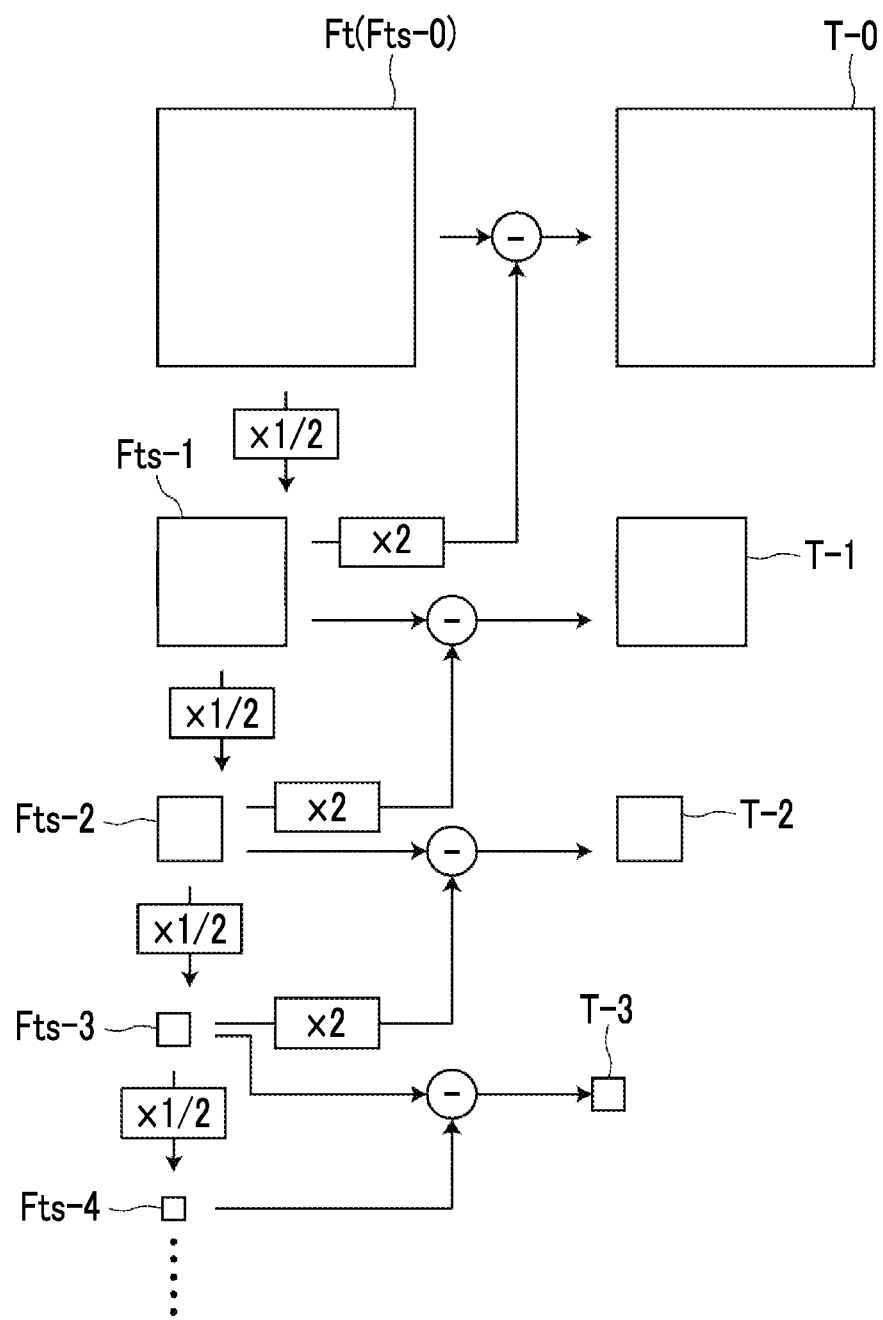
FIG. 13 is a diagram for illustrating frequency resolution.

FIG. 13 is a diagram for illustrating frequency resolution performed by the frequency resolution unit 37. Here, frequency resolution with respect to the processing target frame Ft will be described, but frequency resolution may be similarly performed with respect to the immediately previous frame Ft-1. First, the frequency resolution unit 37 performs a filtering process with respect to the processing target frame Ft using a Gaussian filter of $\sigma=1$, for example, and minifies the processing target frame Ft into ½ to generate a minified frame Fts-1 that is a Gaussian component. The minified frame Fts-1 is a frame obtained by minifying the processing target frame Ft into ½. In the following description, there is a case where the processing target frame Ft is referred to as a processing target frame Fts-0, for ease of description. Then, the frequency resolution unit 37 performs an interpolating operation such as a cubic B-spline interpolation, for example, to enlarge the minified frame Fts-1 twice to have the same size as that of the processing target frame Ft, subtracts the enlarged minified frame Fts-1 from the processing target frame Ft, and generates a band frame T-0 that is a Laplacian component of a maximum frequency band. In this embodiment, the maximum frequency band is referred to as a 0-th frequency band, for ease of description.

Then, the frequency resolution unit 37 performs a filtering process with respect to the minified frame Fts-1 using the Gaussian filter of $\sigma=1$, for example, minifies the minified frame Fts-1 into ½ to generate a minified frame Fts-2, enlarges the minified frame Fts-2 twice to have the same size as that of the minified frame Fts-1, subtracts the enlarged minified frame Fts-2 from the minified frame Fts-1, and generates a band frame T-1 of a first frequency band. Further, by repeating the above processes until a band frame of a desired frequency band is generated, band frames T-k (k=0 to a in which a represents the number of bands) of a plurality of frequency bands are generated. Thus, a minified frame Fts-(a+1) of a minimum frequency is also generated.

Here, a signal value of each pixel of a minified frame represents the density of the pixel, and a signal value of each pixel of the band frame T-k represents the size of a frequency component of a corresponding frequency band in the pixel. By using a technique of multiple resolution transformation such as wavelet transformation, a plurality of band frames T-k having different frequency bands may be generated.

In the fifth embodiment, the movement vector calculation unit 32 calculates a movement vector between the processing target frame Ft and the immediately previous frame Ft-1 for each frequency band. That is, the movement vector calculation unit 32 calculates, in a corresponding frequency band, a movement vector Vt between a band frame of a processing target frame and a band frame of an immediately previous frame. Similarly, the movement vector calculation unit 32 calculates the movement vector Vt with respect to a minified frame of a minimum frequency band.

The index value calculation unit 33 calculates the index value C0 for each frequency band. That is, the index value calculation unit 33 calculates, in the corresponding frequency band, the index value C0 from the band frame of the processing target frame and the band frame of the immediately previous frame. Similarly, the index value calculation unit 33 calculates the index value C0 with respect to the minified frame of the minimum frequency band.

The correction unit 34 calculates a corrected movement vector Vtc for each frequency band. That is, the correction unit 34 corrects, in the corresponding frequency band, the movement vector Vt using the index value C0 to calculate the corrected movement vector Vtc. Similarly, the correction unit 34 calculates the corrected movement vector Vtc with respect to the minified frame of the minimum frequency band.

The registration unit 35 registers the immediately previous frame to the processing target frame for each frequency band. That is, the registration unit 35 registers, in the corresponding frequency band, the band frame of the immediately previous frame Ft-1 to the band frame of the processing target frame Ft on the basis of the corrected movement vector. Similarly, the registration unit 35 performs registration with respect to the minified frame of the minimum frequency band.

The synthesis unit 36 synthesizes the processing target frame Ft and the registered immediately previous frame Ft-1 for each frequency band. That is, the synthesis unit 36 synthesizes, in the corresponding frequency band, the band frame of the processing target frame and the band frame of the registered immediately previous frame Ft-1 to generate a band synthetic frame Tg-k. Similarly, the synthesis unit 36 generates a synthetic frame with respect to the minified frame of the minimum frequency band, and this synthetic frame is referred to as a minified synthetic frame Fgs.

Here, the synthesis unit 36 may generate a band synthetic frame and a minified synthetic frame by addition and averaging in a similar way to the first embodiment. An addition ratio of a band frame and a minified frame generated from the processing target frame Ft and a band frame and a minified frame generated from the immediately previous frame Ft-1 for each frequency band may be different from each other. For example, since an artifact easily occurs in a case where registration fails as a frequency band becomes low, weights of the band frame and the minified frame generated from the processing target frame may be set to become larger as the frequency band becomes lower to generate the band synthetic frame and the minified synthetic frame.

Figure 14:
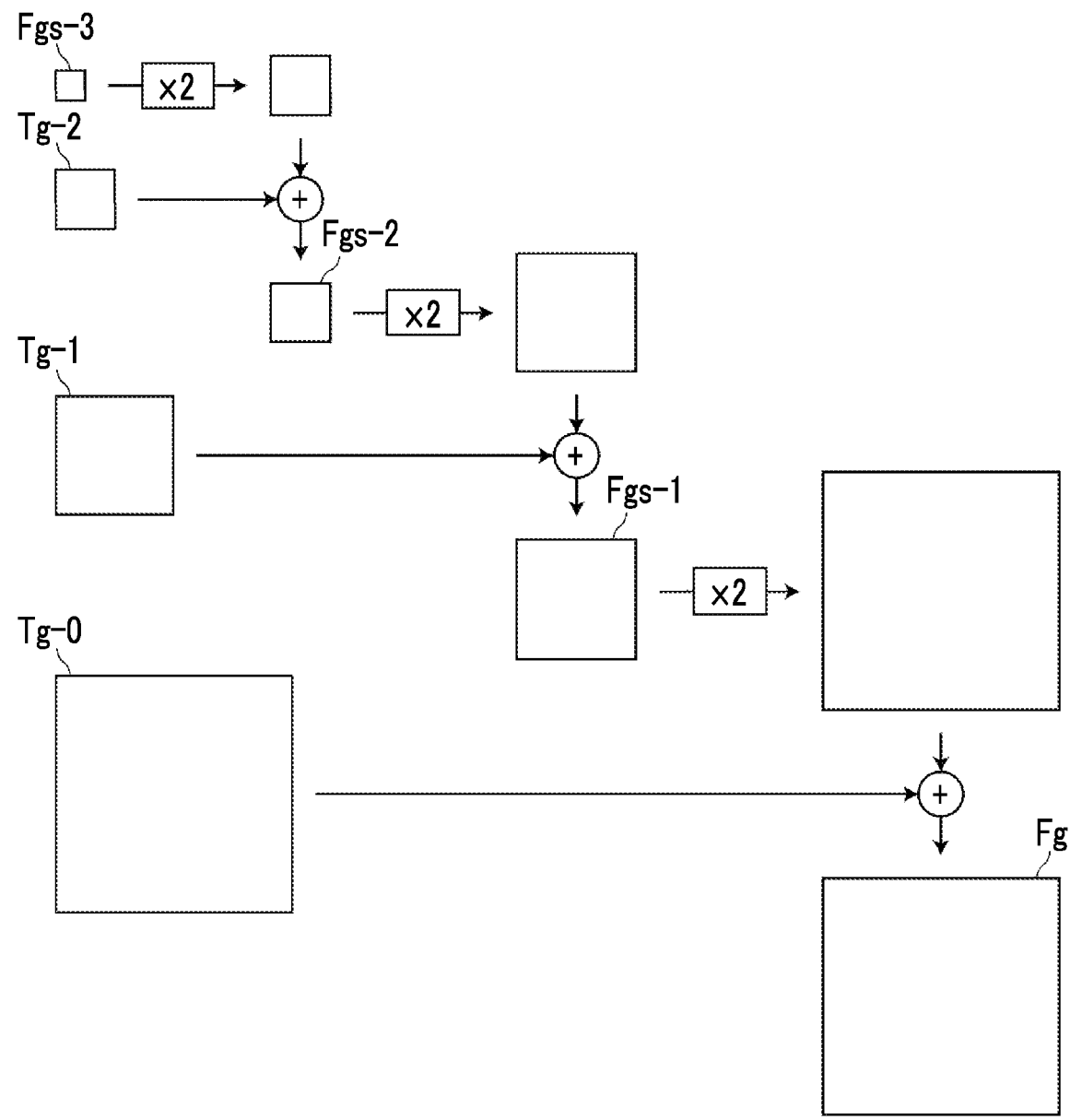
FIG. 14 is a diagram for illustrating frequency synthesis.

The frequency synthesis unit 38 synthesizes the band synthetic frames generated for each of frequency bands to generate a synthetic frame. FIG. 14 is a diagram for illustrating frequency synthesis performed by the frequency synthesis unit 38. In this embodiment, it is assumed that band synthetic frames Tg-0, Tg-1, and Tg-2 up to a second frequency band, and a minified synthetic frame Fgs-3 of a third frequency band are generated.

The frequency synthesis unit 38 enlarges the minified synthetic frame Fgs-3 twice, and adds the minified synthetic frame Fgs-3 that is enlarged twice to the band synthetic frame Tg-2 of the second frequency band to generate a minified synthetic frame Fgs-2. Then, the frequency synthesis unit 38 enlarges the minified synthetic frame Fgs-2 twice, and adds the minified synthetic frame Fgs-2 that is enlarged twice to the band synthetic frame Tg-1 of the first frequency band to generate a minified synthetic frame Fgs-1. Further, the frequency synthesis unit 38 enlarges the minified synthetic frame Fgs-1 twice, and adds the minified synthetic frame Fgs-1 that is enlarged twice to the band synthetic frame Tg-0 of the 0-th frequency band to generate a minified synthetic frame Fgs-0, that is, the synthetic frame Fg.

In the respective embodiments, a synthetic frame with respect to the immediately previous frame, generated using the immediately previous frame Ft-1 as the processing target frame, may be used as the immediately previous frame Ft-1. Particularly, it is preferable to use the immediately previous frame Ft-1 to be registered to the processing target frame Ft using the corrected movement vector in the registration unit 35 as the synthetic frame with respect to the immediately previous frame Ft-1. Thus, it is possible to further reduce an artifact of a synthetic frame with respect to a processing target frame.

Particularly, in the fifth embodiment, in a case where the band synthetic frame and the band minified frame are generated, noise becomes more dominant as the frequency band becomes higher. For this reason, by using the immediately previous frame Ft-1 as the synthetic frame with respect to the immediately previous frame Ft-1 and setting a weight of a band frame generated from the synthetic frame with respect to the immediately previous frame Ft-1 to become larger as the frequency band becomes higher to generate a band synthetic frame, it is possible to generate a synthetic frame with reduced noise.

Further, in the respective embodiments, the immediately previous frame Ft-1 is registered to the processing target frame Ft to generate a synthetic frame. However, the synthetic frame may be generated using a plurality of previous frames including the immediately previous frame Ft-1. In this case, the movement vector calculation unit 32 calculates movement vectors between the processing target frame Ft and a predetermined number of previous frames. For example, in a case where the number of previous frames to be used is 3, that is, the previous frames Ft-1, Ft-2, and Ft-3 are used, a movement vector between the processing target frame Ft and the previous frame Ft-1, a movement vector between the processing target frame Ft and the previous frame Ft-2, and a movement vector between the processing target frame Ft and the previous frame Ft-3 are calculated. Similarly, the index value calculation unit 33 calculates index values C0 between the processing target frame Ft and a predetermined number of previous frames. Further, similarly, the correction unit 34 corrects a movement vector between the processing target frame and at least one previous frame using the index value C0. The registration unit 35 registers the plurality of previous frames Ft-1, Ft-2, and Ft-3 to the processing target frame Ft on the basis of the corrected movement vector. Here, a synthetic frame with respect to each of the previous frames Ft-1, Ft-2, and Ft-3 may be used. Further, the frequency synthesis unit 38 synthesizes the processing target frame Ft and the registered previous frames Ft-1, Ft-2, and Ft-3 to generate a synthetic frame.

In a case where the processing target frame Ft and the registered previous frames are weighted and added to generate the synthetic frame Fg, first, by calculating an absolute value of a difference value at corresponding pixel positions of the processing target frame Ft and the registered previous frame Fct-3, setting the weight of the processing target frame Ft to become larger as the absolute value of the difference value becomes larger, and performing weighting and addition with respect to the processing target frame Ft and the registered previous frame Fct-3, a synthetic frame Fg-2 is generated. Then, by calculating an absolute value of a difference value at corresponding pixel positions of the synthetic frame Fg-2 and the registered previous frame Fct-2, setting the weight of the synthetic frame Fg-2 to become larger as the absolute value of the difference value becomes larger, and performing weighting and addition with respect to the synthetic frame Fg-2 and the registered previous frame Fct-2, a synthetic frame Fg-1 is generated. In addition, by calculating an absolute value of a difference value at corresponding pixel positions of the synthetic frame Fg-1 and the registered previous frame Fct-1, setting the weight of the synthetic frame Fg-1 to become larger as the absolute value of the difference value becomes larger, and performing weighting and addition with respect to the synthetic frame Fg-1 and the registered previous frame Fct-1, a synthetic frame Fg is generated.

In the respective embodiments, in a case where the corrected movement vector Vtc is calculated by multiplying the movement vector Vt by the index value C0 at each pixel position, it is preferable to normalize the index value C0 into a value of 0 to 1. However, in a case where the corrected movement vector Vtc is calculated without multiplying the movement vector Vt, by the index value C0, for example, in a case where the movement vector Vt at a pixel position where the index value C0 becomes 0 is set to 0, or in a case where the corrected movement vector Vtc at a pixel position where the index value C0 is not 0 is set to the movement vector Vt as it is, the index value C0 may not be normalized.

Further, in the respective embodiments, an X-ray motion picture of the subject H is used as a processing target, but a motion picture acquired by a digital video camera or the like may be set as a processing target.

Hereinafter, effects of the embodiments will be described.

By setting a previous frame to a synthetic frame with respect to the previous frame, it is possible to reduce an artifact of a synthetic frame with respect to a processing target frame.

By calculating an index value having a larger value as the size of an object included in a motion picture becomes larger and its movement amount becomes larger, it is possible to reduce an artifact of a synthetic frame.

With respect to an object that actually moves in a motion picture, since a line structure extracted from a first difference image generated by calculating an absolute value of a difference value between corresponding pixels of a processing target frame and at least one previous frame is relatively long and an interval between corresponding line structures becomes large, a movement becomes large. Accordingly, by calculating an index value on the basis of the size and a movement of the line structure extracted from the first difference image, it is possible to calculate an index value having a larger value as the size of the object included in the motion picture becomes larger and its movement amount becomes larger. As a result, it is possible to reduce an artifact of a synthetic frame.

With respect to an object that actually moves in a motion picture, since a line structure extracted from a first difference image generated by calculating an absolute value of a difference value between corresponding pixels of a processing target frame and an immediately previous frame is relatively long and an interval between corresponding line structures becomes large, a movement becomes large. Further, with respect to at least one second difference image, generated by calculating an absolute value of a difference value between corresponding pixels between temporally adjacent previous frames, among a plurality of previous frames including an immediately previous frame, similarly, since a line structure extracted from the second difference image is relatively long and an interval between corresponding line structures becomes large, a movement becomes large. Accordingly, by calculating an index value on the basis of the size and a movement of the line structure extracted from the first difference image and the size and a movement of the line structure extracted from the second difference image, it is possible to calculate an index value having a larger value as the size of the object included in the motion picture becomes larger and its movement amount becomes larger. As a result, it is possible to reduce an artifact of a synthetic frame.

In this case, since an interval between frames becomes smaller as a frame rate of a motion picture becomes larger, a moving object included in the motion picture is reliably included in a difference image between adjacent frames. On the other hand, since the interval between frames becomes larger as the frame rate of the motion picture becomes smaller, the moving object included in the motion picture is less likely to be included in the difference image between the adjacent frames. For this reason, by setting the number of second difference images to become larger as the frame rate of the motion picture becomes larger, it is possible to reliably calculate an index value having a larger value as the size of the object included in the motion picture becomes larger and its movement amount becomes larger. Accordingly, it is possible to reduce an artifact of a synthetic frame.

In a case where an object included in a motion picture moves, a movement vector between a processing target frame and an immediately previous frame and movement vectors with respect to a plurality of previous frames, corresponding to the object, are relatively large and are directed in the same direction. On the other hand, a movement vector between the processing target frame and the immediately previous frame and movement vectors with respect to a plurality of previous frames, corresponding to noise included in the motion picture, are directed in random directions regardless of their sizes. For this reason, by smoothing the movement vector between the processing target frame and the immediately previous frame and the movement vectors with respect to the plurality of previous frames to calculate an index value in a time axis direction, it is possible to calculate an index value having a large value with respect to the moving object included in the motion picture. Further, by spatially smoothing the movement vector between the processing target frame and the immediately previous frame to calculate the index value, similarly, it is possible to calculate an index value having a large value with respect to the moving object included in the motion picture. Accordingly, by using the index value calculated in this way, it is possible to reduce an artifact of a synthetic frame.

By calculating an absolute value of a difference value between corresponding pixels of a processing target frame and a registered at least one previous frame, setting a weight of the processing target frame to become larger as the absolute value of the difference value becomes larger, and performing weighting and addition with respect to the processing target frame and the at least one previous frame registered to generate a synthetic frame, the weight of the processing target frame is set to become larger at a position where registration can be performed with higher accuracy in the processing target frame, so that the synthetic frame is generated. Thus, it is possible to prevent the occurrence of an artifact due to the fact that the registration of the processing target frame and the at least one previous frame is not performed with high accuracy in the synthetic frame.

By resolving a motion picture into a plurality of frequency bands, calculating an index value for each frequency band, calculating a corrected movement vector for each frequency band, performing registration and synthesis for each frequency band, synthesizing band synthesized frames to generate a synthetic frame, it is possible to perform registration of an object according to the size of the object included in the motion picture. Thus, it is possible to generate a synthetic frame with a reduced artifact.

EXPLANATION OF REFERENCE

1: imaging device
2: computer
3: X-ray source
5: radiation detector
8: display
9: input unit
21: CPU
22: memory
23: storage
31: image acquisition unit
32: movement vector calculation unit
33: index value calculation unit
34: correction unit
35: registration unit
36: synthesis unit
37: frequency resolution unit
38: frequency synthesis unit
Ft, Ft-1, . . . : frame
B0: object
C0: index value

What is claimed is:

1. An image processing apparatus comprising a display and a processor that is configured to:
calculate, from a processing target frame and at least one previous frame that is acquired temporally prior to the processing target frame among a plurality of frames that form a motion picture, a movement vector between the processing target frame and the at least one previous frame;
calculate an index value indicating a degree of reliability of a movement between the processing target frame and the at least one previous frame, from the processing target frame and the at least one previous frame;
correct the movement vector between the processing target frame and the at least one previous frame using the index value to calculate a corrected movement vector;
register the at least one previous frame to the processing target frame on the basis of the corrected movement vector; and
synthesize the processing target frame and the at least one previous frame registered by the processor to generate a synthetic frame,
wherein the processor calculates the index value having a larger value as the size of an object included in the motion picture becomes larger and a movement of the object becomes larger.

2. The image processing apparatus according to claim 1,
wherein the previous frame is a synthetic frame that is generated by synthesizing the previous frame and at least one frame that is acquired temporally prior to the previous frame and is registered by the processor.

3. The image processing apparatus according to claim 2,
wherein the processor calculates the index value having a larger value as the size of an object included in the motion picture becomes larger and a movement of the object becomes larger.

4. The image processing apparatus according to claim 1,
wherein the processor calculates an absolute value of a difference value between corresponding pixels of the processing target frame and the at least one previous frame to generate at least one first difference image, extracts a line structure from the first difference image, and calculates the index value on the basis of the size of the line structure and a movement thereof.

5. The image processing apparatus according to claim 2, wherein the processor calculates an absolute value of a difference value between corresponding pixels of the processing target frame and the at least one previous frame to generate at least one first difference image, extracts a line structure from the first difference image, and calculates the index value on the basis of the size of the line structure and a movement thereof.

6. The image processing apparatus according to claim 1, wherein the processor calculates an absolute value of a difference value between corresponding pixels of the processing target frame and the at least one previous frame to generate at least one first difference image, extracts a line structure from the first difference image, and calculates the index value on the basis of the size of the line structure and a movement thereof.

7. The image processing apparatus according to claim 1, wherein in a case where the previous frame is one immediately previous frame that is temporally adjacent to the processing target frame, the processor calculates an absolute value of a difference value between corresponding pixels of the processing target frame and the immediately previous frame to generate a first difference image, extracts a line structure from the first difference image, calculates an absolute value of a difference value between corresponding pixels between previous frames that are temporally adjacent among a plurality of previous frames including the immediately previous frame to generate at least one second difference image, extracts a line structure from the at least one second difference image, and calculates the index value on the basis of the size and a movement of the line structure extracted from the first difference image and the size and a movement of the line structure extracted from the at least one second difference image.

8. The image processing apparatus according to claim 3, wherein in a case where the previous frame is one immediately previous frame that is temporally adjacent to the processing target frame, the processor calculates an absolute value of a difference value between corresponding pixels of the processing target frame and the immediately previous frame to generate a first difference image, extracts a line structure from the first difference image, calculates an absolute value of a difference value between corresponding pixels between previous frames that are temporally adjacent among a plurality of previous frames including the immediately previous frame to generate at least one second difference image, extracts a line structure from the at least one second difference image, and calculates the index value on the basis of the size and a movement of the line structure extracted from the first difference image and the size and a movement of the line structure extracted from the at least one second difference image.

9. The image processing apparatus according to claim 7, wherein the processor sets the number of the second difference images to become larger as a frame rate of the motion picture becomes larger.

10. The image processing apparatus according to claim 8, wherein the processor sets the number of the second difference images to become larger as a frame rate of the motion picture becomes larger.

11. The image processing apparatus according to claim 1, wherein the processor spatially smoothes the movement vector between the processing target frame and the at least one previous frame to calculate the index value.

12. The image processing apparatus according to claim 2, wherein the processor spatially smoothes the movement vector between the processing target frame and the at least one previous frame to calculate the index value.

13. The image processing apparatus according to claim 1, wherein the processor is further configured to:
store, in a case where the previous frame is one immediately previous frame that is temporally adjacent to the processing target frame, a movement vector with respect to the previous frame,
smooth the movement vector between the processing target frame and the immediately previous frame and the movement vector with respect to the previous frame in a time axis direction to calculate the index value.

14. The image processing apparatus according to claim 1, wherein the processor calculates the index value that is normalized, and
the processor multiplies the movement vector between the processing target frame and the at least one previous frame by the normalized index value to calculate the corrected movement vector.

15. The image processing apparatus according to claim 1, wherein the processor adds and averages the processing target frame and the at least one previous frame registered by the processor for every corresponding pixels to generate the synthetic frame.

16. The image processing apparatus according to claim 1, wherein the processor calculates an absolute value of a difference value between corresponding pixels of the processing target frame and the at least one previous frame registered by the processor, sets a weight of the processing target frame to become larger as the absolute value of the difference value becomes larger, and weights and adds the processing target frame and the at least one previous frame registered by the processor to generate the synthetic frame.

17. The image processing apparatus according to claim 1, wherein the processor is further configured to:
resolve the processing target frame and the at least one previous frame into each of a plurality of frequency bands,
calculate each movement vector between the processing target frame and the at least one previous frame for each frequency band,
calculate the index value for each frequency band,
calculate the corrected movement vector for each frequency band,
register the at least one previous frame to the processing target frame for each frequency band,
synthesize the processing target frame and the at least one previous frame registered by the processor for each of frequency bands to generate each of band synthetic frames, and
synthesize each of the band synthetic frames to generate the synthetic frame.

18. An image processing method comprising:
calculating, from a processing target frame and at least one previous frame that is acquired temporally prior to the processing target frame among a plurality of frames that form a motion picture, a movement vector between the processing target frame and the at least one previous frame;
calculating an index value indicating a degree of reliability of a movement between the processing target frame and the at least one previous frame, from the processing target frame and the at least one previous frame;

correcting the movement vector between the processing target frame and the at least one previous frame using the index value to calculate a corrected movement vector;

registering the at least one previous frame to the processing target frame on the basis of the corrected movement vector; and synthesizing the processing target frame and the at least one previous frame registered to generate a synthetic frame, wherein the index value has a larger value as the size of an object included in the motion picture becomes larger and a movement of the object becomes larger.

19. A non-transitory computer readable recording medium storing an image processing program that causes a computer to execute:

a process of calculating, from a processing target frame and at least one previous frame that is acquired temporally prior to the processing target frame among a plurality of frames that form a motion picture, a movement vector between the processing target frame and the at least one previous frame;

a process of calculating an index value indicating a degree of reliability of a movement between the processing target frame and the at least one previous frame, from the processing target frame and the at least one previous frame;

a process of correcting the movement vector between the processing target frame and the at least one previous frame using the index value to calculate a corrected movement vector;

a process of registering the at least one previous frame to the processing target frame on the basis of the corrected movement vector; and a process of synthesizing the processing target frame and the at least one previous frame registered to generate a synthetic frame wherein the index value has a larger value as the size of an object included in the motion picture becomes larger and a movement of the object becomes larger.

* * * * *